R. A. BAILEY & M. F. W. PLISKE.
HEATING APPARATUS FOR AUTOMOBILES.
APPLICATION FILED DEC. 24, 1910.

1,068,094.

Patented July 22, 1913
2 SHEETS—SHEET 1.

WITNESSES
Samuel Payne
K. H. Butler

INVENTORS
R. A. Bailey and
M. F. W. Pliske.
by
Attorneys.

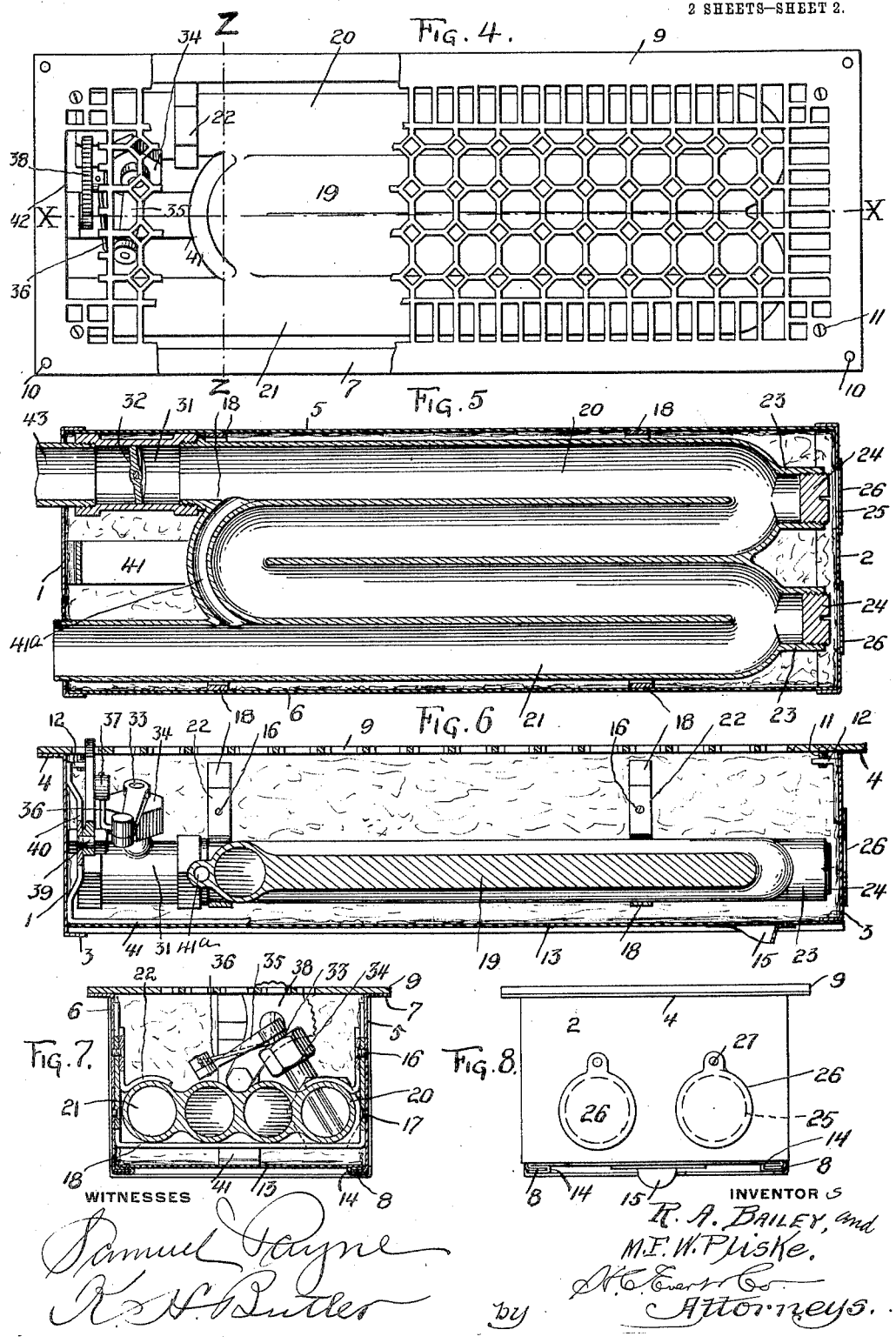

UNITED STATES PATENT OFFICE.

REGINALD A. BAILEY, OF NEW CASTLE, PENNSYLVANIA, AND MAX F. W. PLISKE, OF CLEVELAND, OHIO.

HEATING APPARATUS FOR AUTOMOBILES.

1,068,094.  Specification of Letters Patent.  Patented July 22, 1913.

Application filed December 24, 1910. Serial No. 599,223.

*To all whom it may concern:*

Be it known that we, (1) REGINALD A. BAILEY and (2) MAX F. W. PLISKE, citizens of the United States of America, residing at (1) New Castle and (2) Cleveland, in the counties of (1) Lawrence and (2) Cuyahoga and States of (1) Pennsylvania and (2) Ohio, have invented certain new and useful Improvements in Heating Apparatus for Automobiles, of which the following is a specification, reference being had therein to the accompanying drawing.

This invention relates to heating apparatus for automobiles and other engine driven vehicles, and the primary object of the invention is to utilize the exhaust of an engine for heating the passenger compartment of an automobile, to add to the comfort of the passengers, particularly during winter travel.

Another object of the invention is to furnish a radiator with a heating coil that can be easily cleaned and maintained in an operable condition.

A further object of the invention is to provide an automobile with a novel radiator that can be safely used for heating purposes, the radiator being simple in construction, durable, and efficient for the purposes for which it is intended.

With these and such other objects as may hereinafter appear, the invention consists of the novel construction, combination and arrangement of parts to be hereinafter specifically described and then claimed.

Reference will now be had to the drawings forming part of this specification, wherein there is illustrated a preferred embodiment of the invention, but it is to be understood that the structural elements thereof are susceptible to such changes as fall within the scope of the appended claim.

Figure 1:
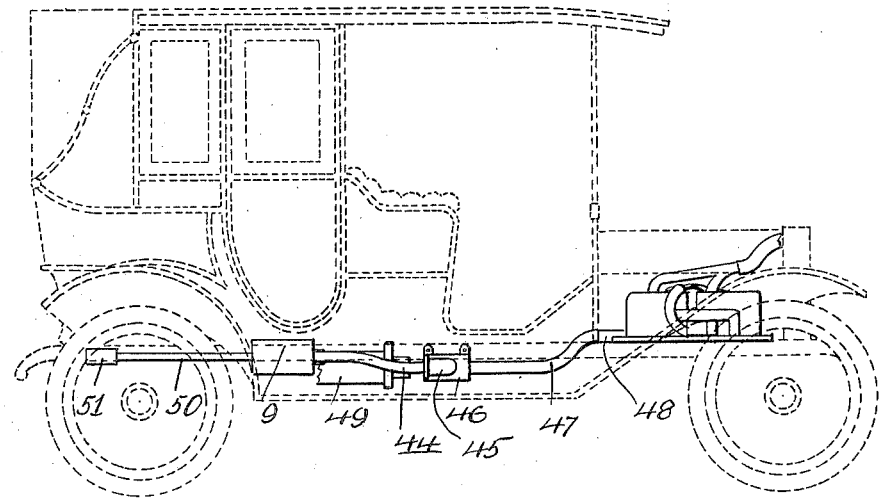
Figure 2:
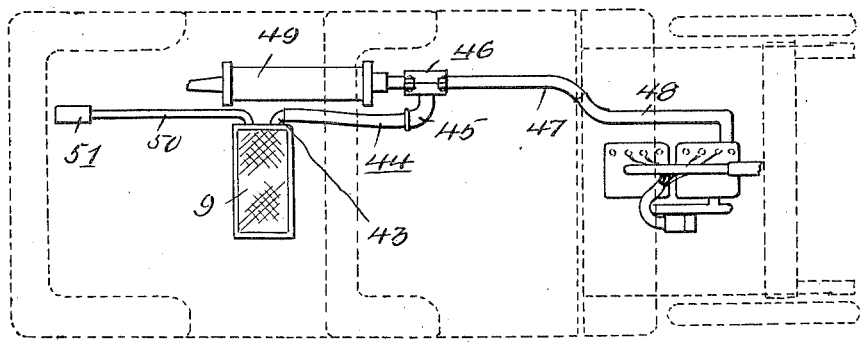
Figure 3:
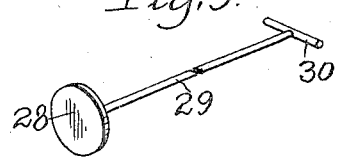

In the drawings:—Figure 1 is a diagrammatic elevation showing the heating apparatus in connection with an automobile, Fig. 2 is a diagrammatic plan of the same, Fig. 3 is a perspective view of a portion of a flexible cleaning device, Fig. 4 is a plan of the radiator partly broken away, Fig. 5 is a sectional plan of Fig. 4, Fig. 6 is a vertical longitudinal sectional view of the radiator on line X—X Fig. 4, Fig. 7 is a vertical sectional view of the radiator on line Z—Z Fig. 4, and Fig. 8 is an end view.

A heating apparatus in accordance with this invention embodies a radiator and in the radiator is located a one-piece coil which is connected to the exhaust pipe of an internal combustion engine, the radiator being located in the floor of an automobile compartment and provided with means whereby it can be easily closed and opened to admit hot exhaust gases to the coil.

The radiator comprises end walls 1 and 2, said walls having the lower and vertical edges thereof flanged inwardly, as at 3 and the upper edges thereof flanged outwardly, as at 4. Side walls 5 and 6 are held in place by the flanges 3, said side walls having the upper edges thereof flanged outwardly, as at 7 and the lower edges thereof flanged inwardly, as at 8.

Supported by the flanges 4 and 7 of the walls 1, 2, 5 and 6 is a grate or perforated cover plate 9 having the ends thereof provided with apertures 10 adapted to aline with similar openings in the flanges 4 and 7, whereby the radiator can be secured to the floor of an automobile in a suitable opening provided therefor. The grate is secured to the upper edges of the walls 1, 2, 5 and 6 by set screws 11 entering brackets 12 suitably secured to the inner sides of the walls 1 and 2.

The flanges 8 of the walls 5 and 6 support a slide 13, said slide having the longitudinal edges thereof bent to provide longitudinal guides 14 adapted to ride upon the flanges 8, said guides forming a dust and dirt proof connection between the slide 13 and the lower edges of the walls 5 and 6. The slide 13 is of a length corresponding to the box of the radiator and has one end thereof provided with a depending handle or grip 15, whereby the slide can be easily removed from the box of the radiator when it is desired to cleanse the interior thereof.

Secured to the inner sides of the walls 5 and 6 by screws or other fastening means 16 and 17 are two stirrups 18, these stirrups supporting a one-piece horizontal coil 19, said coil having the inlet pipe 20 and the outlet pipe 21 thereof held upon the stirrups 18 by clamps 22 secured to the upper ends of the stirrups 18 by the screws or other fastening means 16. The outlet pipe end of the coil is connected to the inlet pipe end thereof by a pipe 41$^a$, which can be formed integral with the coil or made separate, the object of this pipe being to relieve the pressure in the supply end of said coil. The coil 19 is preferably made of aluminum and has the end thereof adjacent to the end wall 2 provided with nipples 23 normally closed by detachable screw plugs 24. In order that the nipples can be easily removed and the coil cleansed, the end wall 2 is provided with openings 25 normally closed by shutters 26 pivotally connected to the outer side of the wall 2, as at 27. By reason of the by-pass 41ª, the pressure of the exhaust on the initial or first bend is relieved to such an extent as to reduce the pressure on the supply end of the coil to a point where such pressure will not affect such end when the coil is made of comparatively thin metal. Hence the coil will provide a maximum efficiency of heat with a minimum weight.

A suitable device for cleaning the coil comprises a disk or head 28 connected to a flexible rod 29 having the opposite end thereof provided with a suitable handle 30. The cleaning head 28 can be easily shifted in the convolutions of the coil to remove carbon or other matter that might adhere to the inner walls of the coil.

The inlet pipe 20 of the coil terminates in the radiator and is coupled to a conventional form of butterfly valve 31, said valve having the shutter or leaf 32 thereof mounted upon a stem 33 extending through a stuffing box 34, carried by the valve 31. The outer end of the stem 33 is provided with a crank 35 and loosely connected to the outer end of the crank is a link 36, said link being connected to a boss 37, carried by a pivoted tread lever 38 connected by a bolt 39 to a bracket 40 suitably secured to the inner side of the wall 1. The lower end of the bracket is provided with an extension 41 in parallelism with the lower edges of the walls 5 and 6, said bracket being located centrally of the radiator box whereby the extension 41 thereof will serve functionally as a guide for the inner end of the slide 13. The pivoted tread lever 38 protrudes through an opening 42 provided therefor in the grate 9 and the upper edges of said tread lever are serrated or roughened, whereby it can be easily shifted with the foot.

The valve 31 is connected by a branch pipe 43, a flexible connection 44 and an elbow 45 to a coupling 46 located upon the main exhaust pipe 47 of an internal combustion engine 48. The exhaust pipe 47 is provided with a muffler 49, and the outlet pipe 21 is connected to an exhaust 50 extending rearwardly and having a small muffler 51. As will be seen, the connections between the heating attachment 9 and the exhaust pipe are valve-controlled, while the exit for the exhaust gases from the heating coil is permanently open excepting for the back pressure provided by the independent muffler 51. Consequently, in use, the amount of gases which are passed through the coil may be controlled without affecting the operation of the device by back pressure, it being readily understood that since the muffler 51 is intended to provide for action when the maximum amount of exhaust is introduced into the coil, a reduction in the gases introduced will decrease the amount of pressure provided by said muffler, and the pressure produced by the muffler will be proportional to the amount of gases passing therethrough, insuring a circulation of the heated gases through the coil regardless of the amount which is introduced.

It is thought that the operation and utility of the heating apparatus, particularly in connection with an automobile for utilizing the exhaust of the engine thereof will be apparent without further description, and it is to be understood that the radiator can be made of various sizes and materials and the walls thereof lined with asbestos or any suitable non-fusible material.

It is obvious that the heating apparatus can be used in connection with a motor boat or any type of conveyance using an internal combustion engine.

What we claim is:—

A heating attachment for motor vehicles, comprising a casing, a coil mounted in said casing and having its inlet end valve-controlled, said inlet end being adapted to be connected to the exhaust pipe of the vehicle motor, said coil having a plurality of connected legs forming a sinuous passage way therethrough, the outlet end of the coil being located at the same end of the casing with the inlet end and being permanently open, a pipe leading from said outlet end, and a muffler carried by said pipe, said muffler being operable solely with said coil, the legs of said coil adjacent to the inlet and outlet ends of the coil being connected by a permanently-open by-pass to relieve the supply end of the coil from excessive pressure.

In testimony whereof we affix our signatures in the presence of two witnesses.

REGINALD A. BAILEY.
MAX F. W. PLISKE.

Witnesses:
R. W. Hazen,
Clyde Gibson.